July 14, 1959

S. HANSEN 2,894,535

FLEXIBLE PRESSURIZED CONDUIT

Filed Sept. 26, 1955

INVENTOR,
SIEGFRIED HANSEN
BY
Seymour M. Rosenberg
ATTORNEY

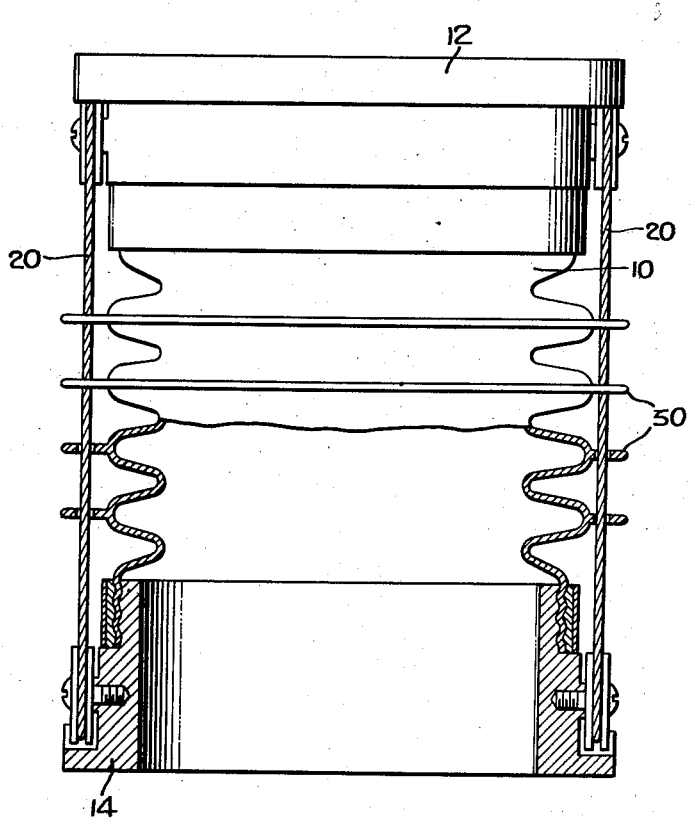
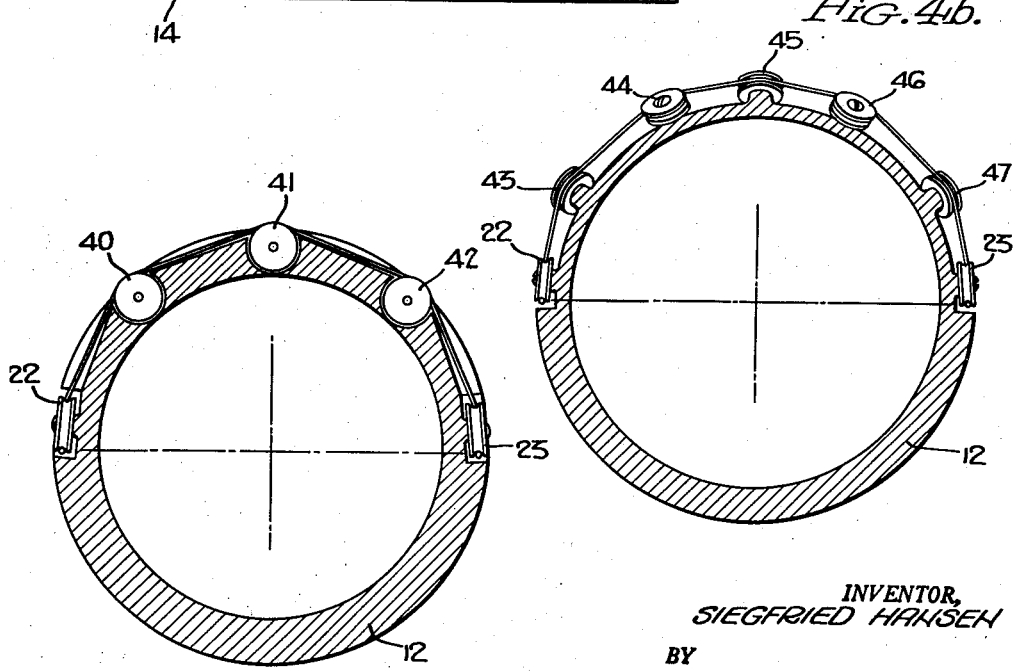

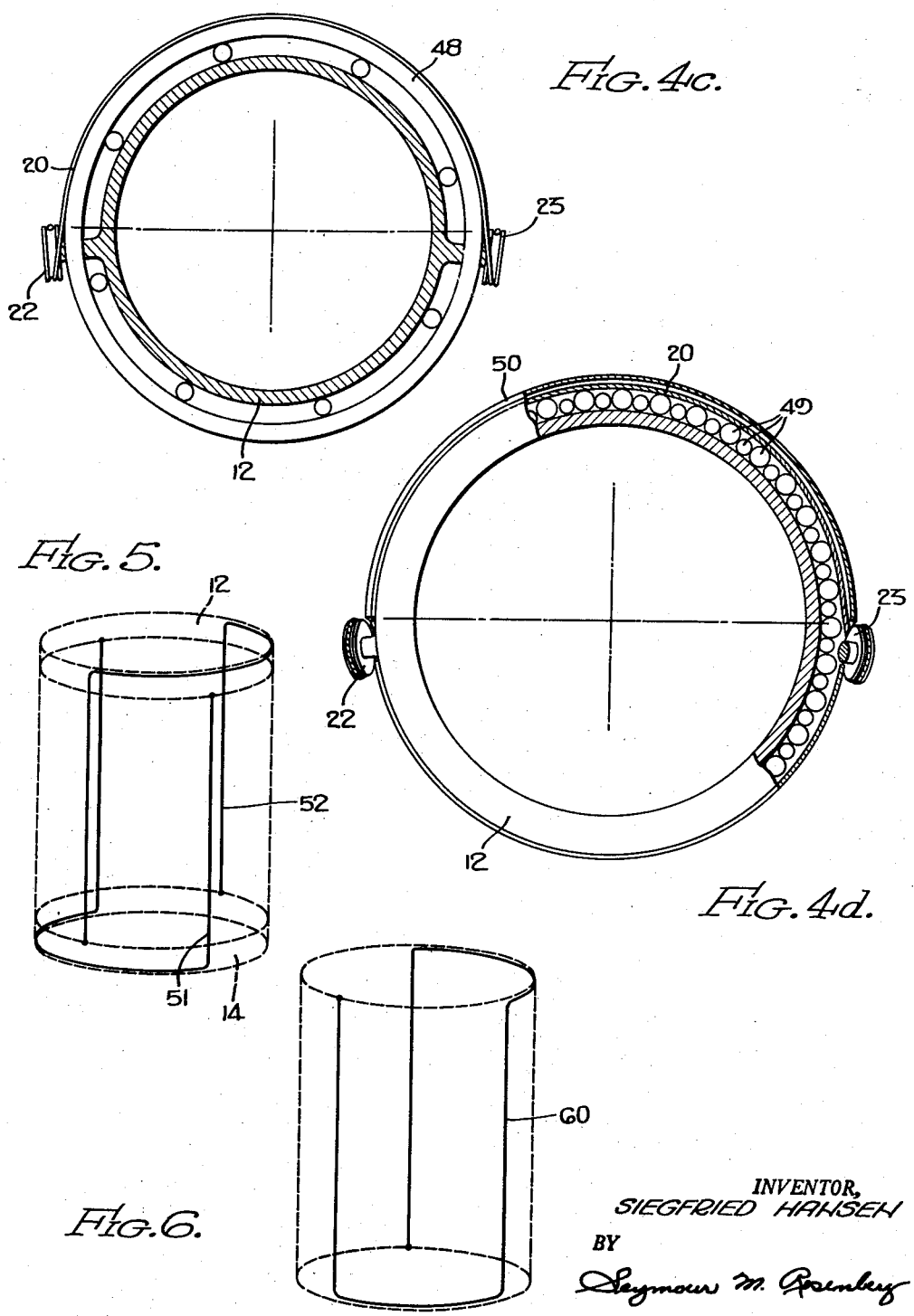

July 14, 1959

S. HANSEN 2,894,535

FLEXIBLE PRESSURIZED CONDUIT

Filed Sept. 26, 1955

INVENTOR,
SIEGFRIED HANSEN
BY
Seymour M. Rosenberg
ATTORNEY

United States Patent Office 2,894,535
Patented July 14, 1959

2,894,535

FLEXIBLE PRESSURIZED CONDUIT

Siegfried Hansen, Los Angeles, Calif., assignor to Litton Industries of California, Beverly Hills, Calif.

Application September 26, 1955, Serial No. 536,596

19 Claims. (Cl. 138—49)

This invention relates to a flexible pressurized conduit and more particularly to a flexible conduit which is constrained to a substantially constant volume whereby the flexibility of the conduit is unimpaired by pressure differentials created when the pressure within the conduit exceeds the external pressure.

In the prior art, numerous forms of flexible conduits have been employed for transferring or containing fluids, both gaseous and liquid, under pressure. In many of these applications the ends of the conduit are affixed to relatively massive objects, as for example in refueling vessels at sea, and the tendency of high pressures within the conduit to elongate or deform the conduit are of little or no consequence. There are many applications, however, in which it is desirable to have the conduit as flexible when it is under pressure as it is when there is no pressure differential between the interior and exterior of the conduit. It is in these latter applications that the conventional flexible conduits frequently prove unsatisfactory owing to the fact that the pressure within the conduit tends to deform the conduit to that configuration which provides the maximum volume for the fluid therein; for example, if the conduit is constructed of conventional reinforced bellows tubing, the natural tendency of the conduit under pressure is to straighten out and elongate.

In the prior art at least one flexible bellows conduit has been developed which successfully withstands elongation under pressure and which provides flexibility in one plane. According to this prior art technique, a pair of non-stretchable fabric strips are affixed to the convolutions of the bellows at points spaced 180° apart, the strips thus functioning to prevent elongation of the bellows and permitting flexure of the bellows in a plane perpendicular to the common plane of the strips. Nevertheless, this prior art conduit still is hampered by the fact that a positive pressure differential will produce a straightening force of relatively large magnitude which inhibits flexure in most directions. Consequently, the expenditure of considerable work may be required to flex the conduit to a desired position, and a restraining force may be required to retain the conduit in the position to which it has been bent.

It has been proposed in the past to solve the foregoing problem by constructing pressurized flexible conduits which include two or three rigid tubes intercoupled by metal ball-and-socket joints having communicating passages therethrough. However, it has been found that this proposed scheme has several inherent disadvantages. Firstly, there is a relatively severe restriction of freedom of movement which often defeats the purpose for which the flexible conduit was intended. Secondly, there is a relatively large amount of friction in the joints, thereby detracting materially from the flexibility of the conduit. Finally, it is virtually impossible to prevent some leakage of fluid from the joints, and although this latter disadvantage may not be particularly damaging in some applications of the conduit, it may be intolerable in others as where the flexible conduit is employed to provide flexible joints in a pressure suit intended for use in a vacuum chamber, for example.

The present invention overcomes the above and other disadvantages of the flexible pressurized conduits of the prior art by providing a flexible conduit which, according to the basic concept of the invention, is constrained to present a substantially constant volume under pressure while nevertheless permiting complete freedom of movement with exceptionally low frictional forces. More specifically, the flexible pressurized conduits of the invention employ a section of bellows tubing of preselected length, and a volume stabilizing cable system which intercouples the ends of the bellows section at two or more points and which is operative to maintain substantially constant the lateral area and hence the volume of the bellows section during flexure by compensating for any lateral extension of the section on one side with a conjugate contraction of the section on the opposite side.

In its preferred form, the volume stabilizing cable system comprises a single stabilizing cable of constant length which traverses the length of the bellows section in at least two spaced points, the cable being passed over a pulley system or the like at at least one end of the bellows section whereby flexure of the section increases the length of cable traversing the section at one of the points while concomitantly decreasing the length of cable which traverses the section at the other point. In this manner it may be shown that when the bellows section is flexed, as from a cylindrical shape to a toroidal section, for example, the lateral area and consequently the volume of the bellows section is maintained substantially constant.

According to still other embodiments of the invention, a plurality of stabilizing cables may be employed with each bellows section, or a single cable which traverses the bellows section more than twice may be utilized. It is also a feature of the invention that the stabilizing cables may be affixed at their ends to the ends of the bellows section, or may comprise continuous cable loops which are mounted on a pulley system at each end of the bellows section.

It is a still further feature of the invention that the volume stabilizing cable system employed in any embodiment of the pressurized fluid conduit may be located either within the associated bellows section or outside the section, depending upon which arrangement is most desirable for the specific application of the conduit. In addition, each stabilizing cable is preferably constrained laterally by suitable eyelets or the like appended to the bellows section whereby the cable runs which longitudinally traverse the bellows section are always maintained substantially parallel to the adjacent walls of the section.

It is therefore, an object of the invention to provide flexible pressurized conduits which retain their normal flexibility when subjected to pressure.

Another object of the invention is to provide a flexible pressurized conduit which is constrained to a substantially constant volume whereby the flexibility of the conduit is unimpaired by a positive pressure differential between the interior and exterior of the conduit.

A further object of the invention is to provide flexible conduits which include a flexible bellows section and a volume stabilizing cable system for maintaining substantially constant the volume of the bellows section when the section is pressurized.

Still another object of the invention is to provide flexible pressurized conduits which include a flexible bellows section and a volume stabilizing cable system which is operative to compensate for an extension of the bellows section on one side during flexure with a conjugate contraction on the opposite side of the section.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 3 is a front elevation, partly in section, of a modified form of flexible pressurized conduit, according to the invention, in which the stabilizing cable system is external of the fluid containing conduit;

Figs. 4a, 4b, 4c and 4d are sectional schematic diagrams of four different pulley systems which may be employed for suspending the stabilizing cable of the embodiment of Fig. 3;

Figs. 5 and 6 are diagrammatic illustrations of other forms of stabilizing cable systems which may be employed in the flexible pressurized conduits of the invention;

Figure 7:
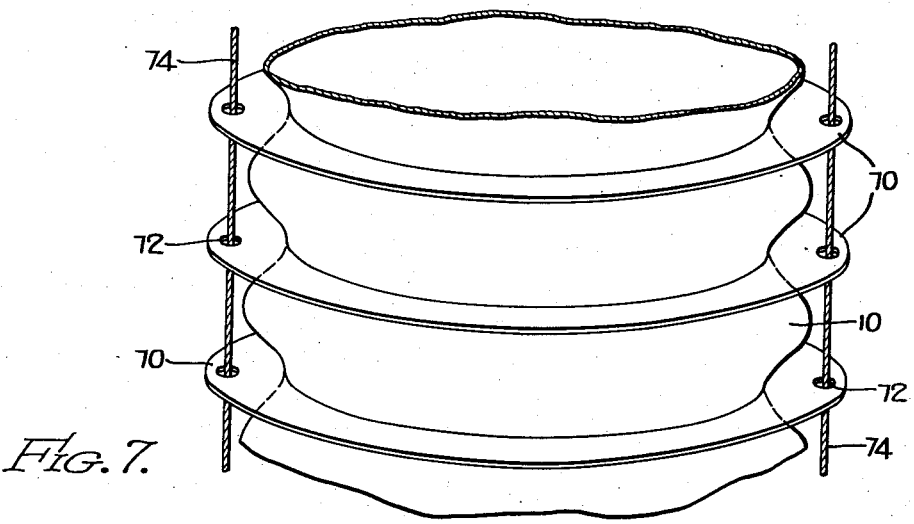
Figure 8:
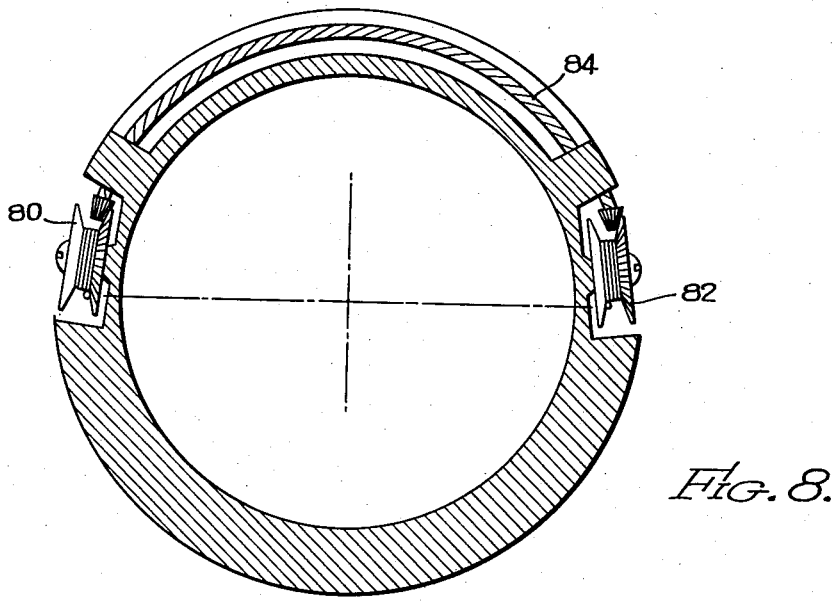

Fig. 7 is a perspective view of a portion of a flexible pressurized conduit, according to the invention, illustrating a modified form of restraining device which may be employed for restraining lateral movement of the stabilizing cable system during flexure of the conduit; and Fig. 8 is a sectional schematic diagram of a modified form of suspension device which may be employed in the flexible conduits of the invention for suspending the volume stabilizing cable system.

Figure 1:
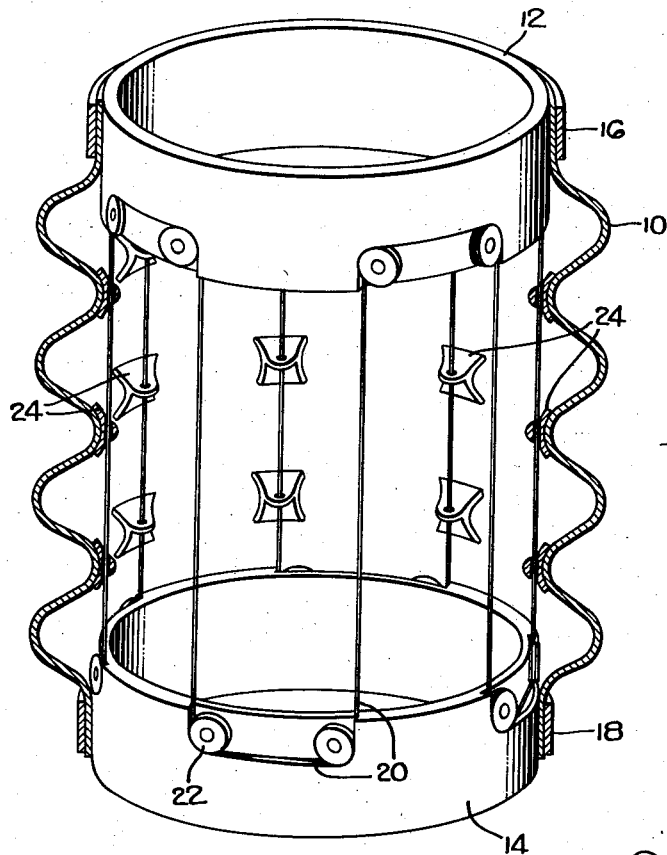
Fig. 1 is a perspective view, partly in section, of one form of flexible pressurized conduit, according to the invention, illustrating the basic components thereof.

With reference now to the drawings, wherein like or corresponding parts are designated by the same reference characters throughout the several views, there is shown in Fig. 1 a flexible pressurized conduit, according to the invention, which remains completely flexible even under the positive pressure differentials which are created when pressure within the conduit exceeds the external pressure. Basically the flexible conduit of the invention here shown includes four elements, namely, a flexible bellows section 10, a pair of rigid annular members 12 and 14 to which the ends of the bellows section are clamped by a pair of clamping rings 16 and 18, respectively, and a volume stabilizing cable system which includes a stabilizing cable 20 and a plurality of pulleys, such as pulley 22, which are affixed to members 12 and 14 and which support the stabilizing cable.

Bellows section 10 is preferably constructed of rubberized fabric or the like, although it will be understood that the invention may also be practised by employing relatively thin-skinned metallic bellows sections. In either case, the bellows section should respond readily to bending moments, while nevertheless being constrained by its construction to provide a substantially constant mean cross-sectional area. In addition it will be recognized that the bellows section and all connections thereto should be gas-tight to prevent any leakage of the fluids which might be contained therein. Since numerous forms of commercially available bellows tubing conform to the foregoing specifications, a more detailed description of the bellows section and of its construction is considered unnecessary.

In the particular embodiment of the invention shown in Fig. 1, the stabilizing cable system utilizes a single continuous cable loop 20 of constant length which is mounted within bellows section 10 and which longitudinally traverses the length of the bellows section at eight spaced points adjacent its interior walls. In accordance with the invention the stabilizing cable may be fabricated from either stranded wire or from conventional cordage, such as nylon or silk for example, the only limiting factors being that the cable must be flexible, have a relatively high tensile strength, and be essentially non-elastic.

It will be noted that the stabilizing cable system employed in the particular embodiment of the invention shown in Fig. 1 utilizes sixteen pulleys over which cable 20 is threaded, one pair of pulleys being associated with each longitudinal traversal of the bellows section by cable 20. At the ends of the bellows section the cable is then strung to the adjacent pulley pairs whereby cable 20 forms a continuous loop which effectively intercouples the ends of the bellows section with eight courses of cable. It should be pointed out that the pulleys are preferably housed or caged in a suitable manner so as to insure that the stabilizing cable cannot jump from the grooves therein; in the flexible conduit of Fig. 1, for example, annular members 12 and 14 are each recessed at four regions, each recess being utilized for mounting one pulley from each of two adjacent pairs of pulleys, and being spaced from its associated pulley by a distance sufficiently small to prevent escape of the cable from the pulley.

Figure 2A:
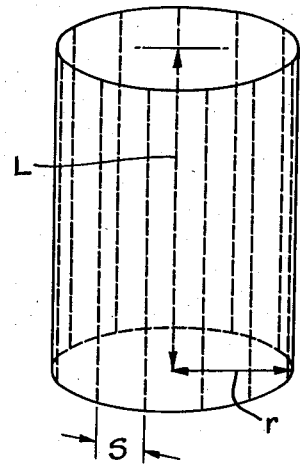
Figs. 2a and 2b are line diagrams illustrating the mode of operation of the flexible pressurized conduits of the invention.

Consider now the motivating concept of the flexible pressurized conduits of the invention and the manner in which complete flexibility of the conduits is assured despite positive pressure differentials which may be created either by raising the internal pressure relative to the external pressure or by lowering the external pressure relative to the internal pressure. With reference now to Fig. 2a there is shown a line diagram of a cylindrical bellows section of substantially constant mean cross-sectional area. The volume of the cylinder will be recognized as $$V_c = \pi r^2 L \tag{1}$$

while the lateral area of the cylinder is given by $$A_c = 2\pi r L \tag{2}$$

where $r$=radius of the mean cross-section; and $L$=the length of the cylinder.

Recall now the normal effects of increasing the pressure within a bellows section relative to the external pressure. Owing to the fact that the fluid contained within a conduit tends to deform the conduit to that configuration which provides the largest volume, the bellows section will tend to both straighten out and to elongate. If it is assumed, therefore, that elongation is prevented by some form of fixed restraints fastened to the sides of the bellows, it will be recognized that the bellows when flexed will still be acted upon by a straightening force when it is subjected to a positive pressure differential, since flexure can only be accomplished in this instance with a decrease in volume. Clearly then, the restraining device employed in conjunction with the bellows section cannot be completely fixed, since it follows from the foregoing discussion that to achieve flexibility the volume of the bellows section must be maintained constant. Stated differently, in order to provide flexibility it is a necessary condition that the bellows bend in such a manner as to do no work on the compressed fluid therein, since a restoring force will otherwise result which will oppose the bending.

Figure 2B:
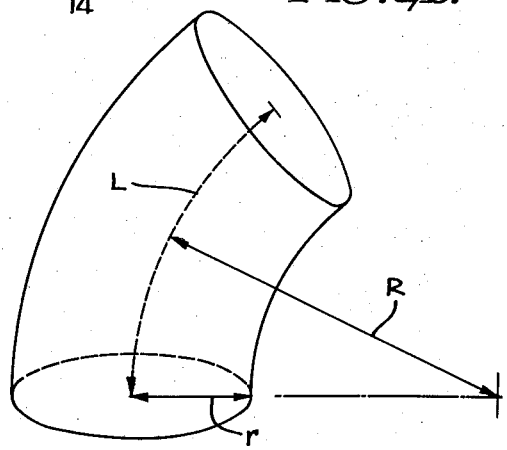

Assume now that the cylindrical bellows section of Fig. 2a may be bent in the form of a toroidal section of length L, as shown in Fig. 2b. Inasmuch as the radius of the mean cross-sectional area of the bellows remains constant, it may be shown that the volume of the toroidal section is $$V_T = \pi r^2 L = V_c \tag{3}$$

which expression is independent of the toroidal radius R. Accordingly it will be recognized that the desired flexibility may be achieved if the constraining device maintains constant the center length L of the bellows section.

It is readily apparent, of course, that it is not practical to place a direct restraint on L since the center of the conduit is preferably unobstructed in almost all applications of flexible pressurized conduits. However, the same effect may be achieved by holding constant the lateral area of the bellows section since the lateral area of the toroidal section may be shown to be $$A_T = 2\pi r L = A_c \quad (4)$$

Consider now the manner in which the lateral area of the bellows section may be held constant. It will be recognized that the area of a cylindrical or toroidal section may be defined by ruling a set of closely spaced elemental areas on its surface. Thus for example the lateral area of the cylindrical section shown in Fig. 2a may be defined as $$A_c = sl \quad (5)$$

where $s$ is the width of the elemental areas and $l$ is now the total length of all of the elemental areas. If now the cylindrical section is bent to a toroidal form in such a manner as to maintain constant the width (S) of the elemental areas, some of the elemental areas will lengthen while others will shorten in a conjugate manner whereby the total area will remain constant.

With reference once again to the embodiment of Fig. 1, it will be seen that each pair of adjacent cable runs define in essence an elemental area of the bellows section. Moreover, it will be noted that the stabilizing cable is laterally constrained to a position adjacent the walls of bellows section 10 by a plurality of apertured tabs 24 which are appended to the convolutions of the bellows section and through which stabilizing cable 20 is threaded.

Thus, the stabilizing cable will respond to a bending moment in a plane parallel to the plane of any two adjacent cable runs with a contraction of one of the runs and a conjugate extension of the other run. Consequently, the pressurized conduit of the invention may be readily flexed with a minimum of frictional forces and without encountering any appreciable restoring force, the stabilizing cable moving relative to the pulley system so as to compensate for any extension of the bellows section on one side with a compensating and conjugate contraction on the opposite side.

It will of course be recognized that numerous modifications or alterations may be made in the flexible pressurized conduits of the invention without departing from the fundamental concept thereof. With reference now to Fig. 3, for example, there is shown a flexible pressurized conduit which has been constructed in accordance with the principles herein disclosed and which includes a volume stabilizing cable 20 located external of its associated bellows section 10. Still another feature of this particular embodiment of the invention is that stabilizing cable 20 only makes two longitudinal runs or traversals of the bellows section at points located 180° apart, the cable being passed around the annular ends of the bellows section by a suitable pulley system, only a portion of which is shown. In addition, Fig. 3 also illustrates the use of a plurality of apertured rings 30 appended to the convolutions of bellows section 10 for restraining the cable runs laterally so as to maintain the cable continuously parallel to the sides of the bellows section.

With reference now to Figs. 4a through 4d, there are shown four different forms of pulley systems which may be employed with a flexible pressurized conduit of the type shown in Fig. 3 for leading the stabilizing cable circumferentially around the annular end members which are affixed to the ends of the bellows section. In the pulley system of Fig. 4a three idler pulleys 40, 41 and 42, mounted within annular end member 12 and rotatable in the plane thereof, are employed for conducting the cable between a pair of pulleys 22 and 23 from which the longitudinal cable runs are strung. In a similar manner the pulley system of Fig. 4b also employs idler pulleys for conducting stabilizing cable 20 around member 12, the particular pulley system here shown utilizing five idler pulleys 43 through 47 which are skewed with respect to the plane of member 12. In this specific pulley system stabilizing cable 20 is alternately threaded over and under adjacent idler pulleys and is thus conducted between pulleys 22 and 23 from which the longitudinal cable runs begin.

The pulley system of Fig. 4c, on the other hand, utilizes a grooved outer bearing race 48 for conducting the stabilizing cable between pulleys 22 and 23, the inner bearing race constituting annular member 12 to which the associated bellows section is affixed. It will be noted that cable 20 goes approximately ¾ of the way around pulleys 22 and 23 so as to permit an optimum tangential transition between the pulleys and outer race 48. The pulley system of Fig. 4d is analogous to the system of Fig. 4c except that the intermediate section of stabilizing cable 20 is conducted around the periphery of annular member 12 by a plurality of rollers 49 which are positioned in a groove machined in member 12 and which are enclosed by a cover 50. It will be noted that alternate rollers preferably have a smaller diameter and thus function as spacers or idlers without imparting a braking force to the cable as it is moved over the rollers in operation.

In each of the embodiments of the invention thus far shown and described the volume stabilizing cable system has comprised only a single continuous cable loop. However, it is to be expressly understood that the invention also encompasses the use of more than one stabilizing cable, and in addition, the use of open loop stabilizing cables which are rigidly fastened at their ends. With reference to Fig. 5, for example, there is shown schematically a flexible pressurized conduit, according to the invention, in which the stabilizing cable system includes two open ended stabilizing cables 51 and 52, the ends of cable 51 being affixed to annular member 12 while the ends of cable 52 are affixed to annular member 14. It will be noted that each of the stabilizing cables here shown includes two longitudinal runs which are spaced substantially 180° apart.

Although the ends of each of the stabilizing cables in Fig. 5 are connected to the same annular end member, it will be appreciated that opposite ends of the stabilizing cables could be affixed to opposite ends of the associated bellows section. As illustrated in Fig. 6, for example, the stabilizing cable could comprise a single cable 60 having an odd number of evenly spaced longitudinal cable runs with opposite ends of the cable connected to opposite ends of the flexible pressurized conduit. It should be pointed out, however, that in general the use of continuous loop stabilizing cables is preferred owing to the fact that wear on the cables is more evenly distributed.

It will be recalled that in practising the invention herein set forth, it is preferable to laterally constrain the longitudinal cable runs so as to maintain the relationship between the elemental area defined by any two adjacent cable runs and the corresponding projected area of the bellows section. In most applications of the flexible conduits of the invention the use of eyeletted tabs, as shown in Fig. 1 for example, will prove satisfactory. However, if the flexible pressurized conduits of the invention are to be employed where the positive pressure differential is relatively high, the bellows section may have a tendency to increase in mean cross-sectional area despite the fact that its construction tends to inhibit expansion in this manner. Should this problem arise it may be overcome by utilizing a lateral restraining device of the type shown in Fig. 7, wherein a plurality of rings 70, fabricated from sheet metal, phenolic or the like, are seated in the convolutions of the bellows section. These rings may then be apertured with suitable eyelets, such as eyelet 72, for laterally constraining an associated stabilizing cable 74. Thus the rings serve the double function of laterally constraining the stabilizing cable and constraining to a constant value the cross-sectional area of the bellows section.

It will of course be recognized that numerous other modifications and alterations may be made in the flexible pressurized conduits herein disclosed without departing from the spirit or scope of the invention. As shown in Fig. 8, for example, instead of employing a pulley system the flexible conduit could employ a pair of capstans 80 and 82 for suspending opposing longitudinal cable runs, the capstans being interconnected by a conventional flexible cable 84 so that if one capstan functions to lengthen its associated cable run the other capstan will function to shorten its associated cable run. Accordingly it is to be expressly understood that the scope of the invention is to be limited only by the scope of the appended claims.

What is claimed as new is:

1. A flexible pressurized conduit capable of being easily flexed when the internal pressure exceeds the external pressure, said conduit comprising: a flexible tubular section of substantially constant mean cross-sectional area; and means for maintaining substantially constant the volume defined by said tubular section when said section is subjected to a bending moment, said means including at least one volume stabilizing cable of constant length positioned adjacent to and longitudinally traversing said section in at least two spaced points, and supporting means affixed to one end of said section for suspending said cable at said one end between said spaced points to permit redistribution of a portion of said cable from one of said points toward the other of said points in response to a bending moment in the plane of said cable whereby the application to said section of a bending moment results in a longitudinal extension of said section on one side thereof and a conjugate contraction on the opposite side thereof.

2. The flexible pressurized conduit defined in claim 1 wherein said flexible tubular section is composed of bellows tubing.

3. A flexible pressurized conduit capable of being easily flexed when the internal pressure exceeds the external pressure, said conduit comprising: a section of bellows tubing of substantially constant mean cross-sectional area; and means for maintaining substantially constant the volume defined by said tubular section, said means including at least one volume stabilizing cable of constant length positioned adjacent to and longitudinally traversing said section in at least two spaced points, and supporting means affixed to one end of said section for suspending said cable at said one end between said spaced points, said supporting means including an annular end member affixed to said one end of said bellows section, and a plurality of pulleys mounted on said member for suspending said stabilizing cable at said one end of said section, at least two of said pulleys being positioned on said annular end member adjacent said spaced points for suspending the portions of said cable which longitudinally traverses said bellows section whereby the application to said section of a bending moment results in a longitudinal extension of said section on one side thereof and a conjugate contraction of the opposite side thereof.

4. The flexible pressurized conduit defined in claim 3 which further includes cable constraining means for laterally constraining to a position adjacent the sides of said bellows section the portions of said cable which longitudinally traverse said section.

5. The flexible pressurized conduit defined in claim 4 wherein said cable constraining means includes a plurality of eyeletted tabs appended to the convolutions of said bellows section at said two spaced points, said cable being threaded through the eyelets in said tabs.

6. The flexible pressurized conduit defined in claim 4 wherein said cable constraining means includes a plurality of rings positioned in the convolutions of said bellows section, said rings being apertured at said spaced points for threading said cable therethrough.

7. The flexible pressurized conduit defined in claim 4 wherein said stabilizing cable comprises a continuous loop of cable, and which further includes a second supporting means at the other end of said bellows section for suspending said cable at said other end of said section.

8. The flexible pressurized conduit defined in claim 4 wherein said stabilizing cable, said pulleys, and said cable constraining means are all located within said bellows section.

9. The flexible pressurized conduit defined in claim 4 wherein said stabilizing cable, said pulleys and said cable constraining means are all located external of said bellows section.

10. A flexible pressurized conduit capable of being easily flexed when the internal pressure exceeds the external pressure, said conduit comprising: a flexible bellows section having a substantially constant mean cross-sectional area; and means for maintaining the volume defined by said section when flexed substantially the same as the volume of said section when unflexed, said means including at least one volume-stabilizing cable of constant length positioned adjacent to and longitudinally traversing said section in a plurality of spaced points, adjacent traversals by said cable being displaced circumferentially from each other about said section by approximately $260/n$ degrees where $n$ is the number of longitudinal traversals of said cable, cable supporting means affixed to opposite ends of said bellows section for suspending said volume stabilizing cable and for interconnecting the portions of said cable which longitudinally traverse said bellows section, and lateral constraining means appended to the convolutions of said bellows section for constraining the longitudinal traversals of said cable to positions adjacent said bellows section.

11. The flexible pressurized conduit defined in claim 10 wherein $n$ equals two, whereby said cable longitudinally traverses said bellows section at first and second points spaced 180° apart, and wherein said cable supporting means includes a pair of annular end members affixed to opposite ends of said bellows section, at least one of said annular end members including a pulley system for interconnecting the two traversals of said bellows section by said cable.

12. The flexible pressurized conduit defined in claim 11 wherein said pulley system includes first and second pulleys mounted on said one end member at approxiately said first and second spaced points for guiding said cable in its two longitudinal traversals of said bellows section, the planes of said pulleys being substantially perpendicular to the plane of said annular end member, and a plurality of idler pulleys mounted on said one end member intermediate said first and second pulleys for suspending about the intermediate circumference of said end member the portion of said cable intermediate the longitudinal traversals of said cable.

13. The flexible pressurized conduit defined in claim 12 wherein said idler pulleys are mounted in a common plane parallel to the plane of said one annular end member and tangent to said first and second pulleys.

14. The flexible pressurized conduit defined in claim 12 wherein said stabilizing cable comprises a continuous cable loop and wherein the other of said annular end members also includes a pulley system for interconnecting the two traversals of said bellows section by said cable.

15. The flexible pressurized conduit defined in claim 11 wherein said one end member has a groove in its outer periphery, and wherein said pulley system includes first and second pulleys mounted on said one end member at approximately said first and second spaced points for guiding said cable in its two longitudinal traversals of said bellows section, and a pluarlity of rollers positioned in said groove for guiding said cable between said first and second pulleys and around said one end member.

16. A flexible pressurized conduit which retains its flexibility when the internal pressure exceeds the external pressure, said conduit comprising: a flexible bellows section having a substantially constant mean cross-sectional area; and means for maintaining the lateral area of said section the same when it is flexed as when unflexed whereby the volume of said section is maintained substantially constant, said means including at least one stabilizing cable positioned adjacent said section, said cable traversing said section longitudinally in a plurality of points spaced equidistantly about the circumference of said section, whereby adjacent longitudinal cable runs define elemental areas projected on the lateral surface of said section, means for laterally constraining said cable to follow the contour of the adjacent wall of said section when said section is flexed, and cable supporting means affixed to opposite ends of said section for suspending said stabilizing cable and for interconnecting the portions of said cable which longitudinally traverse said bellows section whereby an increase in the length of one of said cable runs during flexure of said section is accompanied by a conjugate decrease in the length of another of said cable runs thereby to maintain constant the sum of the elemental areas defined by adjacent cable runs.

17. A flexible pressurized conduit constrained from elongating and capable of being easily flexed when the internal pressure exceeds the external pressure, said conduit comprising: a flexible bellows having a substantially constant mean cross-sectional area; at least two flexible cable sections longitudinally traversing said bellows at points spaced circumferentially 180° apart; means for laterally constraining said cable sections to positions adjacent said bellows; and means connected to the ends of said bellows for suspending said cable sections, said means being resonsive to the application to said bellows of a bending moment in the plane of said cable sections for conjugally lengthening one of said longitudinally traversing cable sections and shortening the other of said longitudinally traversing cable sections.

18. A flexible pressurized conduit which retains its flexibility when the internal pressure exceeds the external pressure, said conduit comprising: a flexible bellows section having first and second ends and a substantially constant mean cross-sectional area; a pair of annular end members affixed to opposite ends of said flexible section; a plurality of rings positioned around said flexible section at spaced points for laterally constraining said section; and linkage means intercoupling said rings and said annular end members for maintaining constant the lateral areas of said section between adjacent rings and between said annular end members and adjacent rings when said section is flexed by a bending moment in any direction whereby the volume defined by said flexible section is maintained constant.

19. A flexible pressurized conduit which retains its flexibility when the internal pressure exceeds the external pressure, said conduit comprising: a flexible bellows section having first and second ends and a substantially constant mean cross-sectional area; a pair of annular end members affixed to opposite ends of said flexible section; a plurality of guide means positioned around said section at evenly spaced intervals along the length thereof, and linkage means intercoupling said guide means and said annular end members for maintaining constant the lateral area of said section when said section is subjected to bending moments along two orthogonal axes whereby the volume defined by said section is maintained constant in response to a bending moment in any direction.

References Cited in the file of this patent
UNITED STATES PATENTS

| | | |
|---|---|---|
| 656,679 | Sweet | Aug. 28, 1900 |
| 2,444,988 | Guarnaschelli | July 13, 1948 |
| 2,758,612 | Zaleski | Aug. 14, 1956 |
| 2,804,095 | Schauenberg | Aug. 27, 1957 |